United States Patent [19]
Cho

[11] Patent Number: 5,289,472
[45] Date of Patent: Feb. 22, 1994

[54] METHOD FOR THE TRANMISSION OF MESSAGE ASSOCIATED USER-TO-USER INFORMATION

[75] Inventor: Kon H. Cho, Holmdel, N.J.

[73] Assignee: AT&T Bell Laboratories, Murray Hill, N.J.

[21] Appl. No.: 831,601

[22] Filed: Feb. 5, 1992

[51] Int. Cl.⁵ .................. H04J 3/12; H04L 12/66
[52] U.S. Cl. .................................... 370/110.1
[58] Field of Search ........... 370/60, 60.1, 79, 94.1, 370/94.2, 110.1

[56] References Cited

U.S. PATENT DOCUMENTS 4,884,269 11/1989 Duncanson et al. ............... 370/94.1
4,922,484 5/1990 Yoshida et al. .................. 370/110.1
5,050,005 9/1991 Kagami ........................... 370/110.1
5,067,125 11/1991 Tsuchida ......................... 370/110.1
5,113,396 5/1992 Kagami ........................... 370/110.1
5,134,611 7/1992 Steinka et al. .

*Primary Examiner*—Wellington Chin
*Attorney, Agent, or Firm*—Robert P. Marley

[57] ABSTRACT

A method is disclosed for transmitting information from a non-ISDN compatible communication device to an ISDN compatible receiving device via the D Channel of an Integrated Systems Digital Network. To facilitate this transmission, the information is reformatted, embedded in an ISDN signaling protocol message, and transmitted to an ISDN compatible recipient as Message Associated User-To-User Information.

12 Claims, 5 Drawing Sheets

METHOD FOR THE TRANMISSION OF MESSAGE ASSOCIATED USER-TO-USER INFORMATION

TECHNICAL FIELD

The present invention relates to the transmission of message associated information over an Integrated Services Digital Network.

BACKGROUND OF THE INVENTION

A typical Integrated Services Digital Network ("ISDN") call connection offers a user simultaneous access to several duplex digital communication channels, including one or more user data channels ("B Channels"), and one control channel ("D Channel"). The B Channels are intended for the transmission of digital information between network users, while the D Channel is primarily intended to carry signaling protocol messages used for initiating and controlling B Channel calls. These D Channel signaling protocol messages conform to a particular data specification designated Q.931. Limited packets of data called user-to-user information ("UUI") may be transmitted along with the control information under this data specification. The UUI need not be related to a currently established B Channel call.

The capability of the D Channel to carry UUI offers some unique data transmission options to ISDN users. For example, an ISDN user may send a limited amount of UUI to an ISDN recipient via the D Channel by establishing a temporary signaling connection ("TSC"). Naturally, a user is charged for establishing a TSC. Another, more cost effective method would be to transmit the UUI as part of a signaling protocol message for initiating a specific B Channel call. This particular type of signaling protocol message is known as a SETUP message, and the UUI sent along with it is designated message associated UUI ("MA-UUI"). The intended recipient's equipment (referred to as Customer Premises Equipment or "CPE") would receive the SETUP message and the MA-UUI, confirm that a B Channel was associated with the SETUP message, and accept the B Channel call. Normally, the sender would be charged for the B Channel connection, and the MA-UUI would be passed to the recipient at no extra cost. In the alternative, if a user were to send a SETUP message, including MA-UUI, to a CPE which refused to accept the associated B Channel call, the recipient CPE would still receive the SETUP message and MA-UUI. A B Channel call attempt may be refused by a CPE if all B Channels connecting to that particular CPE are in use, or if the CPE is configured to accept only D Channel communications. The practice of sending MA-UUI in D Channel SETUP messages, without establishing a B Channel connection, can provide an economical method of communication for ISDN subscribers.

Unfortunately, in order to perform any type of D Channel data transfer, both the sender and the recipient must be able to access an ISDN and have ISDN compatible equipment at their respective locations—so called end-to-end compatibility. While digital transmission networks are expanding, and the number of ISDN subscribers is growing, the overwhelming majority of existing telephone customers do not have ISDN compatible equipment, and cannot access an ISDN. This effectively limits access to the above described data transmission methods to a very small group of individuals.

SUMMARY OF THE INVENTION

In accordance with the invention, a message originating from a non-ISDN compatible communication device is transmitted to an ISDN subscriber as MA-UUI via the D Channel of an ISDN. This is realized by transforming the non-ISDN compatible message into digital data suitable for manipulation by a data processor, extracting the message related information from that digital data, reformatting the extracted message related information, and embedding that reformatted information as MA-UUI in an ISDN SETUP message. That SETUP message is then transmitted, via an ISDN D Channel, to a specific recipient.

DETAILED DESCRIPTION

Figure 1:
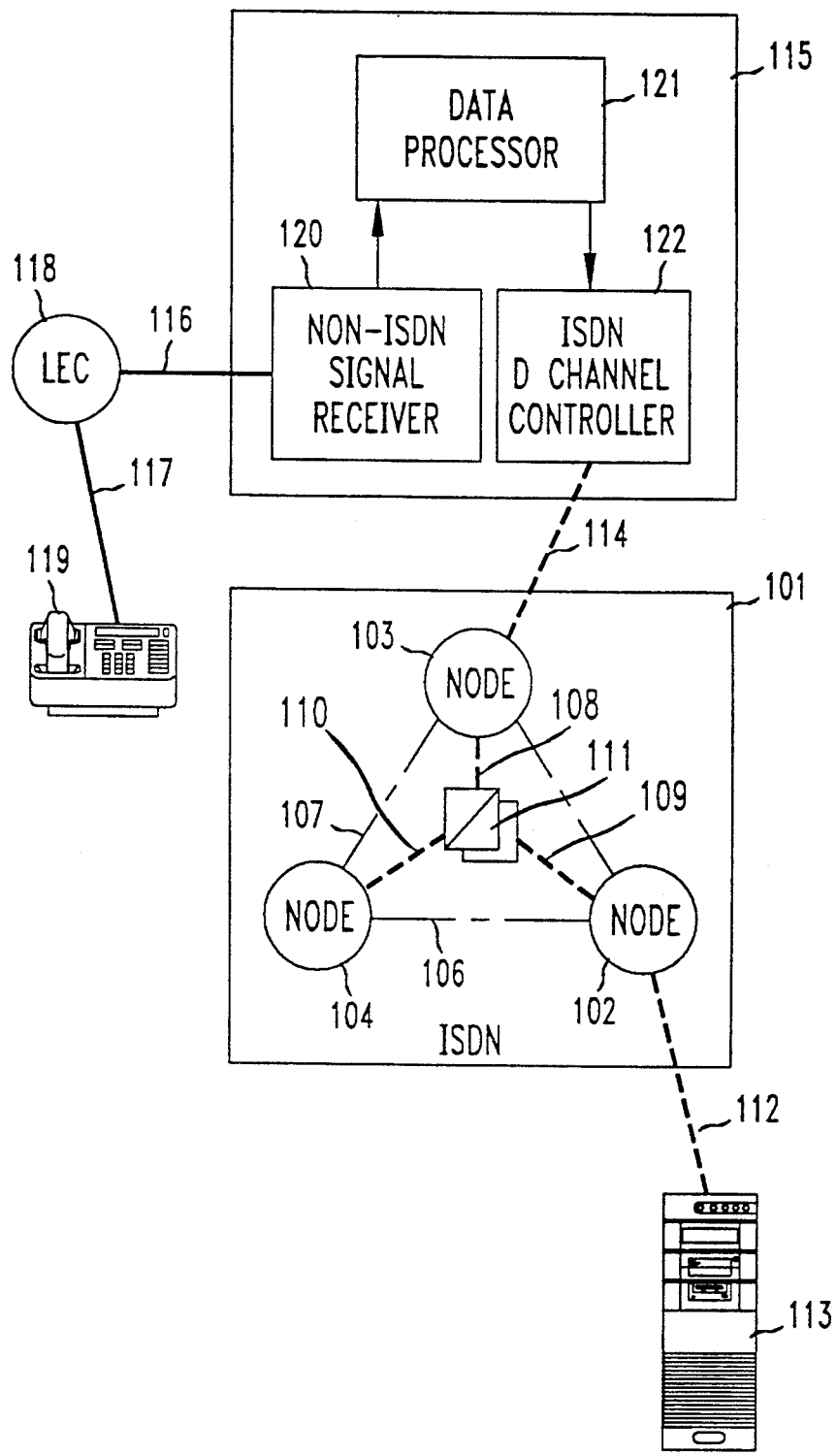
FIG. 1 shows, in simplified block diagram form, details of a telecommunication system which facilitates the practice of the invention wherein a message originating from a non-ISDN compatible telephone is conveyed to an ISDN compatible CPE.

FIG. 1 is a simplified diagram of a telecommunication system which facilitates the practice of a method of the instant invention. Specifically shown is ISDN 101, which is depicted as a network having nodes 102, 103, and 104. Each of the nodes includes a switching mechanism that may be selectively connected to other network nodes via B Channels 105, 106 and 107. These nodes may also be switchably connected to D Channels 108, 109 and 110, which are linked to Signaling System 7 ("SS7") network 111 (an internationally established standard network arrangement). Node 102 may also be switchably connected, via D Channel 112, to ISDN compatible CPE 113. Node 103 may be switchably connected, via D Channel 114, to message translation platform 115. Message translation platform 115 may also be switchably connected, via non-ISDN compatible communication channels 116 and 117, and local telephone exchange carrier ("LEC") 118 to non-ISDN compatible telephone 119.

As shown in FIG. 1, message translation platform 115 is comprised of non-ISDN compatible signal receiver 120, data processor 121, and ISDN D Channel Controller 122. Non-ISDN compatible signal receiver 120 is a system adapted to accept a signal representing a human voice from non-ISDN compatible communication channel 116, and transform that signal into digital data suitable for manipulation by a data processor. This transformation may involve an analog-to-digital conversion if the received non-ISDN compatible signal is analog, or merely a reformatting process if the received non-ISDN compatible signal is digital. Such systems are well known and commercially available. The digital data output from non-ISDN compatible signal receiver 120 is transferred to data processor 121, which extracts a limited amount of message related information from the data. This extracted information is then transferred to ISDN D Channel Controller 122. ISDN D Channel Controller 122 is a specialized data processor which reformats received information and embeds it as MA-UUI within a Q.931 SETUP message (one such commercially available controller is the Chameleon, manufactured by Tekelec Incorporated of Calabasas, Calif.). ISDN D Channel Controller 122 then transmits the SETUP message, via a D Channel, to ISDN compatible CPE 113. The specific instructions for addressing CPE 113 are pre-programmed into ISDN D Channel Controller 122.

In practicing this particular method of the invention, a sender employs non-ISDN compatible telephone 119 to dial or key in a number which initiates a call connection to message translation platform 115. This call connection is effected via LEC 118 and non-ISDN compatible communication channels 116 and 117. As this is a full-duplex voice-band call connection, the most expensive type of call connection involved when practicing the invention, message translation platform 115 should be situated in the same locale as non-ISDN compatible telephone 119 to minimize costs. After establishing contact with message translation platform 115, the sender recites a statement into non-ISDN compatible telephone 119 indicative of a message to be sent to an ISDN compatible CPE. A non-ISDN compatible signal representing the sender's statement is transmitted to non-ISDN compatible signal receiver 120 of message translation platform 115 from non-ISDN compatible telephone 119. As described above, non-ISDN compatible signal receiver 120 transforms the signal into digital data suitable for manipulation by data processor 121. The transformed data is then transmitted to data processor 121 which extracts particular message related information from it. Typically, the extracted information might include specific sequences of numbers and/or the names of particular individuals or products which data processor 121 has been programmed to recognize. After extraction, the message related information is transferred to ISDN D Channel Controller 122. ISDN D Channel Controller 122 reformats and embeds the information as MA-UUI within a Q.931 SETUP message. The SETUP message containing the MA-UUI is then transmitted by ISDN D Channel Controller 122 to recipient CPE 113 via D Channel 114, node 103, D Channel 108, SS7 network 111, D Channel 109, node 102, and D Channel 112.

CPE 113, an ISDN compatible device programmed to receive and decode Q.931 protocol messages, receives the SETUP message, but fails to establish a B Channel call connection with the sender. B Channel communications are not established as CPE 113 is pre-programmed to refuse such call attempts. The embedded MA-UUI is then extracted from the received SETUP message by CPE 113. The invention accomplishes the transfer of the MA-UUI by sending a SETUP message, and utilizing an ISDN D Channel over what should be the longest segment of the call connection between the sender and the recipient CPE.

A second method of the invention may be practiced with a telecommunication system having the same basic configuration as the one which facilitated the previously described method (see FIG. 1). However, the system differs from the previously described configuration in that the non-ISDN compatible signal receiver 120 is adapted to function as a Dual Tone Multifrequency ("DTMF") tone decoder. The non-ISDN compatible signal receiver 120 receives a non-ISDN compatible signal representing DTMF tones, and transform that signal into digital data suitable for manipulation by data processor 121.

As with the previously described method, the sender employs non-ISDN compatible telephone 119 to dial or key in a number which initiates a call connection to message translation platform 115. After establishing contact with message translation platform 115, the sender depresses a series of keys on non-ISDN compatible touch-tone telephone 119 so as to generate a non-ISDN compatible signal representing a sequence of DTMF tones. This non-ISDN compatible signal is indicative of a message to be sent to recipient CPE 113. As in the previously described method, non-ISDN compatible signal receiver 120 transforms the received signal into digital data suitable for manipulation by data processor 121. The transformed data is then delivered to data processor 121 and particular message related information, such as a specific sequence of tones, is extracted from it. This particular message related information is then transferred to ISDN D Channel Controller 122, where it is reformatted and embedded as MA-UUI within a Q.931 SETUP message. Transmission, reception, and decoding of this SETUP message is performed in the same manner as in the above described method of the invention.

Figure 2:
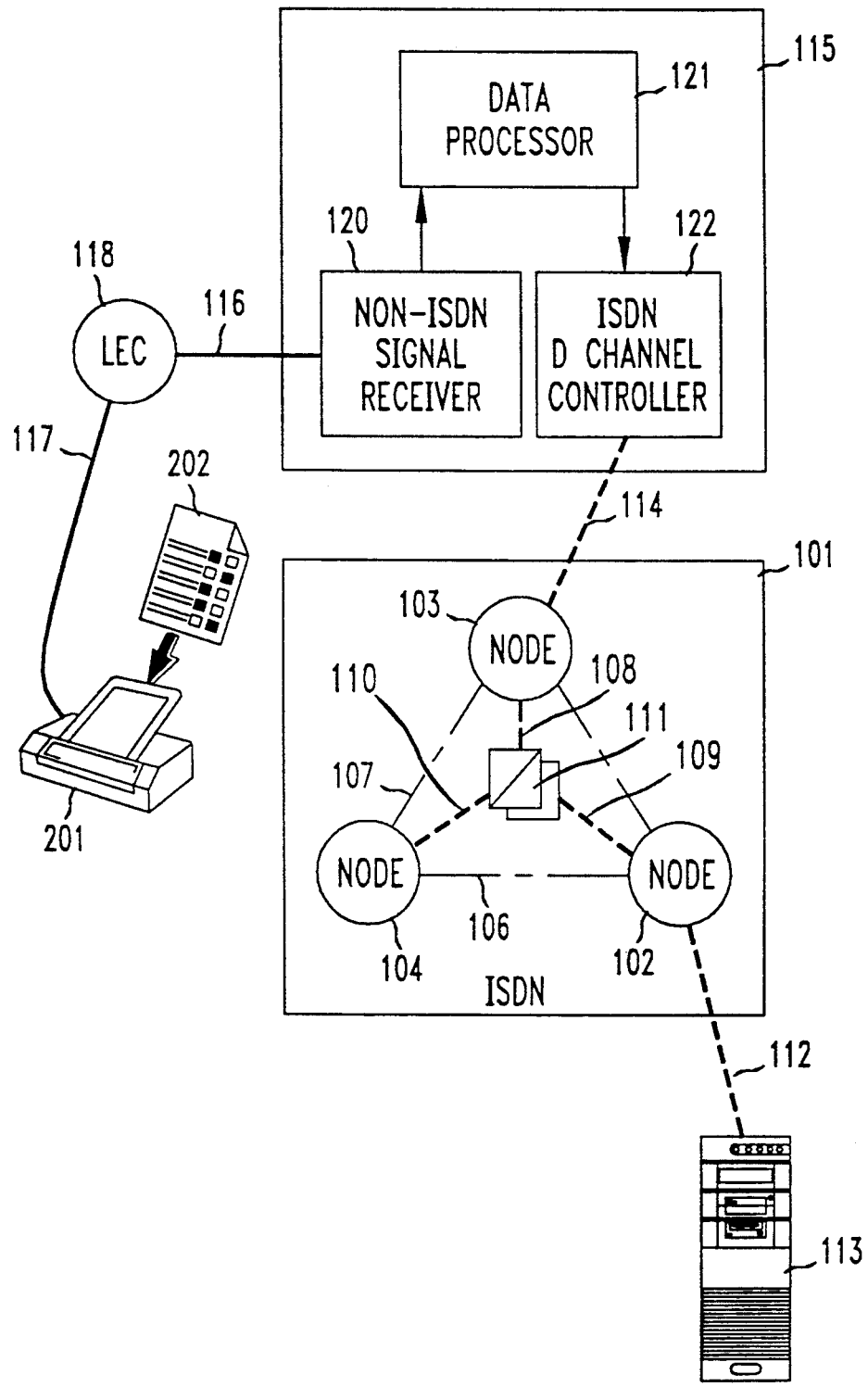
FIG. 2 shows, in simplified block diagram form, details of a telecommunication system which facilitates the practice of the invention wherein a message originating from a non-ISDN compatible facsimile transmitter is conveyed to an ISDN compatible CPE.

FIG. 2 shows a simplified diagram of a telecommunication system which facilitates the practice of a third method of the invention. Unlike the previously described configurations, message translation platform 115 is switchably connected to non-ISDN compatible facsimile transmitter 201, and non-ISDN compatible signal receiver 120 is a facsimile image reader. This facsimile image reader is be adapted to accept a non-ISDN compatible signal representing a facsimile image and transform that signal into digital data suitable for manipulation by data processor 121. Such facsimile image readers are known in the art.

Practice of this particular method of the invention is similar to previously described methods. The sender dials or keys in a number which connects non-ISDN compatible facsimile transmitter 201 to message translation platform 115. After establishing contact with message translation platform 115, the sender allows facsimile transmitter 201 to scan image 202. Image 202 should be indicative of a message to be sent to recipient CPE 113. One possible configuration for such an image is a standardized arrangement of boxes or fields which are darkened or left blank to denote some particular information. Non-ISDN compatible facsimile transmitter 201 generates and transmits a signal representative of image 202 to translation platform 115. As in the previously described methods, non-ISDN compatible signal receiver 120 of translation platform 115 transforms the received non-ISDN compatible signal into digital data suitable for manipulation by data processor 121. The transformed data is then delivered to data processor 121 which extracts particular message related information from it (such as evidence of a particular portion of the scanned image being darkened). Extracted message related information is then transferred to ISDN D Channel Controller 122 where it is reformatted and embedded as MA-UUI within Q.931 SETUP message. Again, the transmission, reception, and decoding of this SETUP message is performed in the same manner as in the previously described methods of the invention.

Figure 3:
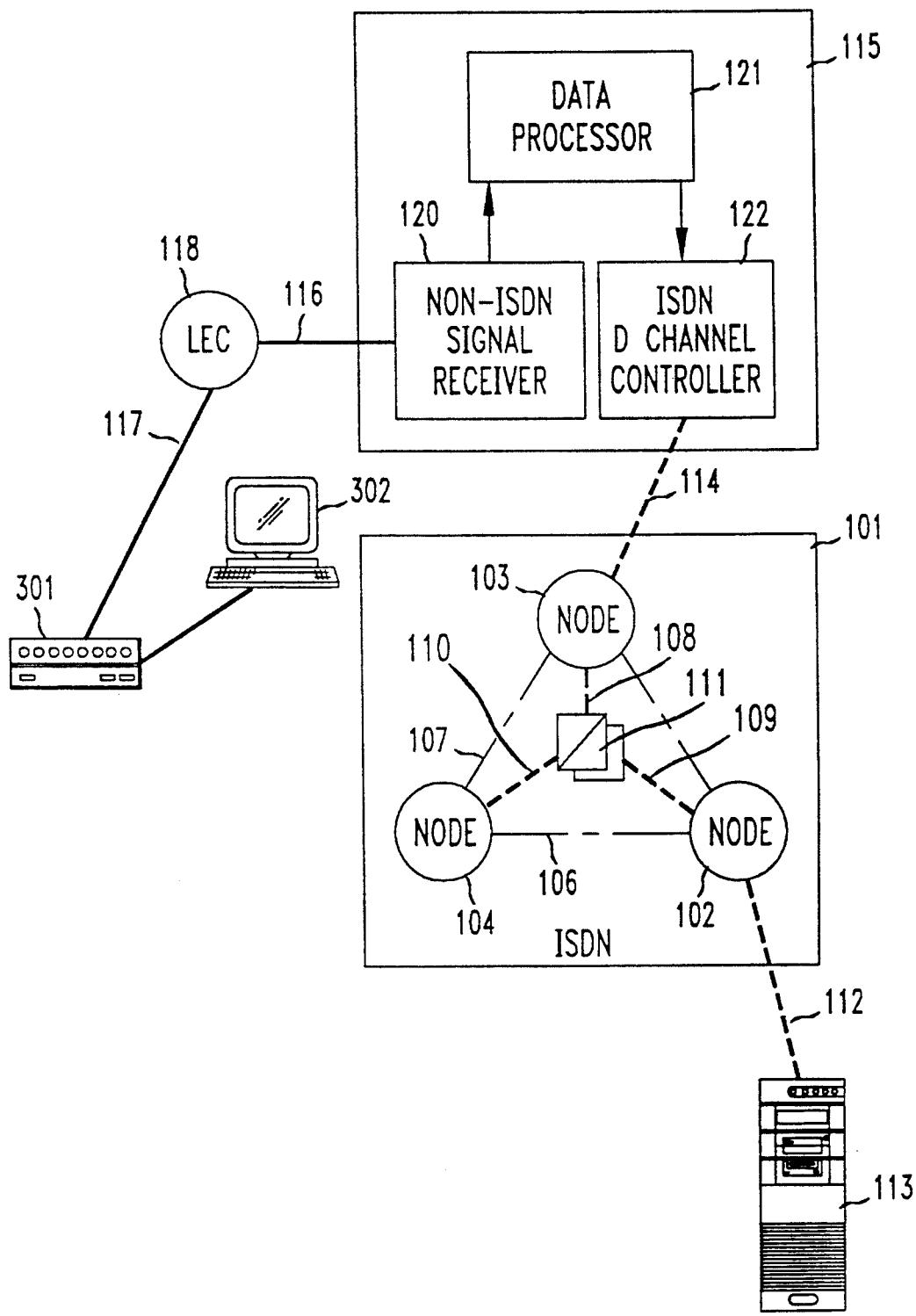
FIG. 3 shows, in simplified block diagram form, details of a telecommunication system which facilitates the practice of the invention wherein a message originating from a non-ISDN compatible modem is conveyed to an ISDN compatible CPE.

A telecommunication system which facilitates the practice of another method of the invention is shown in FIG. 3. In this particular system, the sender employs a non-ISDN compatible modem 301 to transmit message related information to translation platform 115. Non-ISDN compatible signal receiver 120 is adapted receive a signal generated by a non-ISDN compatible modem, and transform that signal into digital data suitable for manipulation by data processor 121.

The practice of this particular method of the invention is similar to previously described methods. The sender dials or keys in a number which connects non-ISDN compatible modem 301 to message translation platform 115. After establishing contact with message translation platform 115, the sender employs computer 302 to instruct modem 301 to transmit a non-ISDN compatible signal to translation platform 115. This signal is indicative of a message to be sent to recipient CPE 113. As in the previously described methods, non-ISDN compatible signal receiver 120 of translation platform 115 transforms the received signal into digital data suitable for manipulation by data processor 121. This transformed data is then delivered to data processor 121 which extracts particular message related information from it. The extracted message related information is then transferred to ISDN D Channel Controller 122, where it is reformatted and embedded as MA-UUI within a Q.931 SETUP message. Transmission, reception, and decoding of this SETUP message is performed in the same manner as in the previously described methods of the invention.

Figure 4:
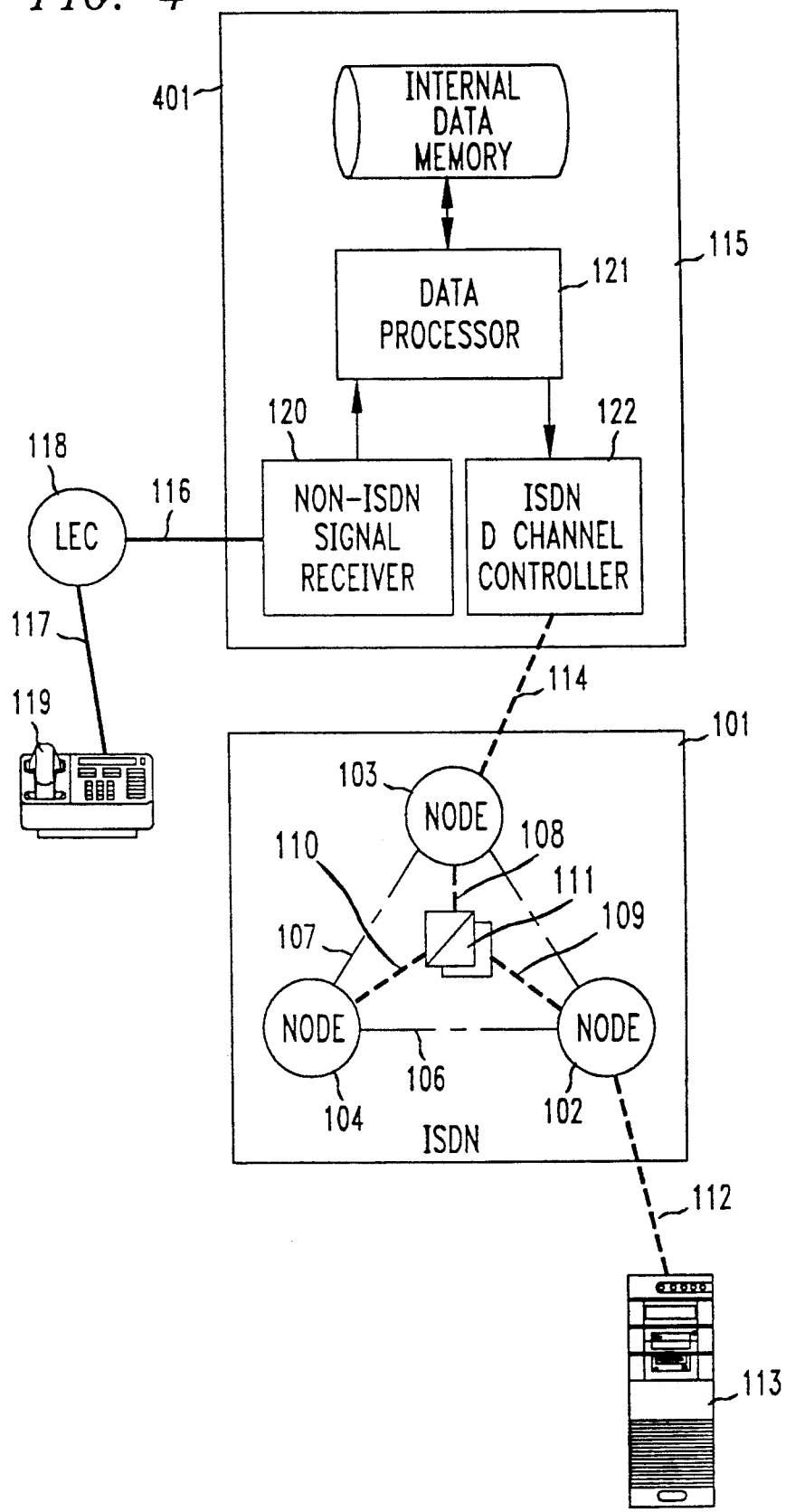
FIG. 4 shows, in simplified block diagram form, details of a telecommunication system employing an addressable data memory which facilitates the practice of the invention.

FIG. 4 shows a simplified block diagram of a telecommunication system which enables the practice of yet another method of the invention. The illustrated system is similar to the one shown in FIG. 1, however, internal data memory 401 has been incorporated in message translation platform 115. Internal data memory 401 contains a listing which cross-references instructions for addressing particular CPE locations with recipient identities. The addition of internal data memory 401 enables the message translation platform 115 to selectively address any one of a number of recipient CPE locations, as opposed to a single, pre-programmed recipient CPE location.

As can be seen in FIG. 4, message translation platform 115 is comprised of non-ISDN compatible signal receiver 120, data processor 121, ISDN D Channel Controller 122, and internal data memory 401. Non-ISDN compatible signal receiver 120 is a Conversant ® (a registered trademark of AT&T) system adapted to accept a signal representing a human voice from non-ISDN compatible communication channel 116, and transform that signal into digital data suitable for manipulation by a data processor. This transformation may involve an analog-to-digital conversion if the received non-ISDN compatible signal is analog, or a reformatting if the received non-ISDN compatible signal is digital. The digital data output from non-ISDN compatible signal receiver 120 is transferred to data processor 121 which extracts a limited amount of recipient identification and message related information from the data. Data processor 121 cross-references the extracted recipient identification information with the listing of instructions for addressing particular CPE locations stored in internal data memory 401, and retrieves corresponding CPE addressing instructions. The retrieved addressing instructions and the extracted message related information are then transferred to ISDN D Channel Controller 122. ISDN D Channel Controller 122 reformats the received message information and embeds it as MA-UUI within a Q.931 SETUP message. ISDN D Channel Controller 122 then transmits the SETUP message, via D Channel 112, to the appropriate ISDN compatible CPE 113 (the address of which was retrieved from internal data memory 401).

In practicing this particular method of the invention, a sender employs non-ISDN compatible telephone 119 to dial or key in number which initiates a call connection to message translation platform 115. This call connection is effected via LEC 118 and non-ISDN compatible communication channels 116 and 117. After establishing contact with message translation platform 115, the sender recites a statement into non-ISDN compatible telephone 119 indicative of a message and the identity of the intended recipient of that message. A non-ISDN compatible signal representing the sender's statement is transmitted to non-ISDN compatible signal receiver 120 of message translation platform 115 from non-ISDN compatible telephone 119. As described above, non-ISDN compatible signal receiver 120 transforms the signal into digital data suitable for manipulation by data processor 121. The transformed data is then transmitted to data processor 121 which extracts from it particular recipient identification and message related information. Instructions for addressing the appropriate recipient CPE are then retrieved from internal data memory 401 by data processor 121. The extracted message information and the recipient CPE addressing instructions are then transferred to ISDN D Channel Controller 122. ISDN D Channel Controller 122 reformats and embeds the message related information as MA-UUI within a Q.931 SETUP. The SETUP message containing the MA-UUI is then transmitted by ISDN D Channel Controller 122 to the appropriate recipient CPE (shown to be CPE 113 in FIG. 4). Reception and decoding of this SETUP message is performed in the same manner as in the previously described methods of the invention.

Figure 5:
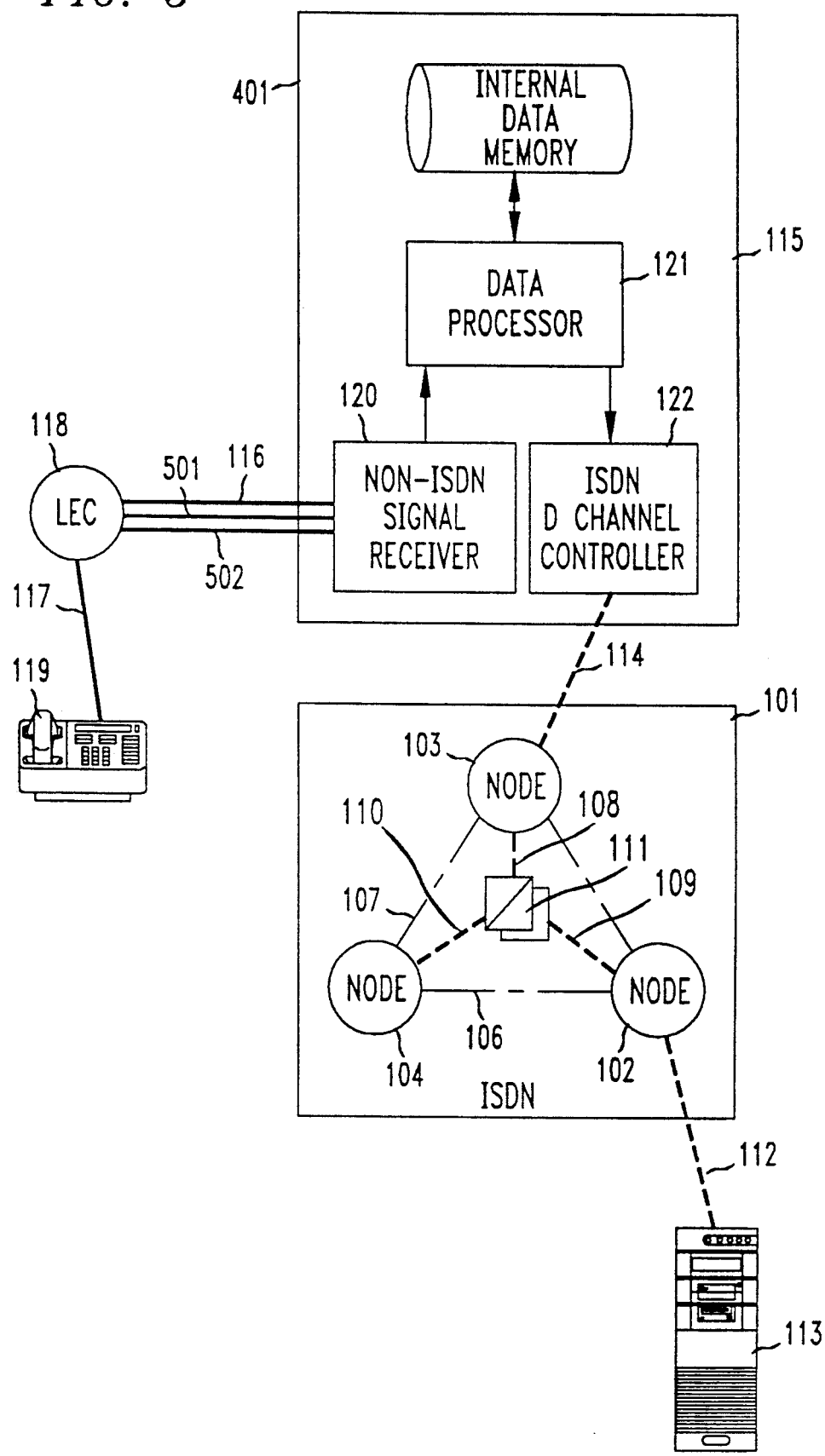
FIG. 5 shows, in simplified block diagram form, details of a second telecommunication system employing an addressable data memory which facilitates the practice of the invention.

Another method of the invention which utilizes internal data storage cross-referencing to facilitate the selective addressing of multiple CPE locations may be practiced with the telecommunication system illustrated in FIG. 5. In most respects the system configuration of FIG. 5 is similar to the one shown in FIG. 4. However, unlike the previously described system of FIG. 4, message translation platform 115 may be switchably connected to several different non-ISDN compatible communication channels (116, 501, and 502). Access to each of these channels is associated with a different number which may be dialed or keyed by a non-ISDN sender. Additionally, non-ISDN compatible signal receiver 120 is adapted to determine which of these communication channels has been accessed by a sender, and provide a digital signal to data processor 121 indicative of that channel. Internal data memory 401 contains a list cross-referencing the different non-ISDN compatible communication channel identities with instructions for addressing particular recipient CPE locations.

In practicing this particular method of the invention, a sender employs non-ISDN compatible telephone 119 to dial or key in number which initiates a call connection to message translation platform 115. This call connection is effected via one of the multiple non-ISDN compatible communication channels which switchably link message translation platform 115 with LEC 118 (the particular channel is a function of the number which the sender dialed or keyed). After establishing contact with message translation platform 115, the sender recites a statement into non-ISDN compatible telephone 119 indicative of a message to be sent to an ISDN compatible CPE. A non-ISDN compatible signal representing the sender's statement is transmitted to non-ISDN compatible signal receiver 120 of message translation platform 115 from non-ISDN compatible telephone 119. As in the previously described methods, non-ISDN compatible signal receiver 120 transforms the signal into digital data suitable for manipulation by data processor 121. The transformed data, along with a digital indication of the particular non-ISDN compatible communication line accessed by the sender, is then transmitted to data processor 121. Instructions for addressing the appropriate recipient CPE are then retrieved from internal data memory 401 by data processor 121 based upon the particular non-ISDN compatible communication line accessed by the sender. The extracted message information and the recipient CPE addressing instructions are then transferred to ISDN D Channel Controller 122. ISDN D Channel Controller 122 reformats and embeds the message related information as MA-UUI within a Q.931 SETUP message. The SETUP message containing the MA-UUI is then transmitted by ISDN D Channel Controller 122 to the appropriate recipient CPE (which is shown to be CPE 113 in FIG. 5). Reception and decoding of this SETUP message is performed in the same manner as in the previously described methods of the invention.

Either of the above described methods which employ internal data storage cross-referencing may also be applied to telecommunication systems wherein a non-ISDN sender employs a DTMF tone generator, a facsimile transmitter, and/or a computer modem to communicate with the message translation platform. The systems to facilitate such would be similar to those already described, however the non-ISDN compatible signal receiver of the systems would be adapted to accept and decode the appropriate type of non-ISDN compatible signal.

The invention will allow the largely untapped D Channel data transmission capabilities of ISDN to be utilized without the need for end-to-end ISDN compatibility. It will be understood that the particular methods described above are only illustrative of the principles of the present invention, and that various modifications could be made by those skilled in the art without departing from the scope and spirit of the present invention, which is limited only by the claims that follow. One such modification might to send the MA-UUI via a signaling protocol message other than a SETUP message (i.e., an Alerting, Connection, or Release message).

I claim:

1. A method for the transmission of message associated user-to-user information comprising the steps of:
   receiving a user generated analog signal containing message related information from a non-ISDN compatible communication channel within a switched telecommunication system;
   transforming said received signal into digital data suitable for data processing;
   processing the digital data so as to extract message related information;
   embedding said extracted message related information within an ISDN compatible signaling protocol message; and
   transmitting said ISDN compatible signaling protocol message to a specific ISDN recipient via a D Channel within a switched telecommunication system.

2. The method of transmitting message associated user-to-user information of claim 1 wherein the received user generated analog signal containing message related information is a signal representing an image transmitted by a facsimile transmitter.

3. The method of transmitting message associated user-to-user information of claim 1 wherein the received user generated analog signal containing message related information is a signal representing digital data encoded and transmitted by a modem.

4. The method of transmitting message associated user-to-user information of claim 1 wherein the received user generated analog signal containing message related information is a signal representing digital data encoded and transmitted by a modem.

5. A method for the transmission of message associated user-to-user information comprising the steps of:
   receiving a user generated analog signal containing message related and recipient related information via a non-ISDN compatible communication channel within a switched telecommunication system;
   transforming said received signal into digital data suitable for data processing;
   processing the digital data so as to extract message related and recipient related information;
   selectively retrieving destination data from a data storage means in response to said extracted recipient related information;
   embedding said extracted message related information within an ISDN compatible signaling protocol message; and
   transmitting said ISDN compatible signaling protocol message to a specific ISDN compatible receiving means via a D Channel within a switched telecommunication system, said receiving means being selected as a function of said retrieved destination data.

6. The method of transmitting message associated user-to-user information of claim 5 wherein the received user generated analog signal containing message related and recipient related information is a signal representing human speech.

7. The method of transmitting message associated user-to-user information of claim 5 wherein the received user generated analog signal containing message related and recipient related information is a signal representing an image transmitted by a facsimile transmitter.

8. The method of transmitting message associated user-to-user information of claim 5 wherein the received user generated analog signal containing message related and recipient related information is a signal representing digital data encoded and transmitted by a modem.

9. A method for the transmission of message associated user-to-user information comprising the steps of:
   receiving a user generated analog signal containing message related information via a non-ISDN compatible communication channel within a switched telecommunication system;
   transforming said received signal into digital data suitable for data processing;
   processing the digital data so as to extract message related information;
   selectively retrieving destination data from a data storage means as a function of the particular non-ISDN compatible communication channel upon which the signal containing message related information was received;
   embedding said extracted message related information within an ISDN compatible signaling protocol message; and
   transmitting said ISDN compatible signaling protocol message to a specific ISDN compatible receiving means via a D Channel within a switched telecommunication system, said receiving means being selected as a function of said retrieved destination data.

10. The method of transmitting message associated user-to-user information of claim 9 wherein the received user generated analog signal containing message related information is a signal representing human speech.

11. The method of transmitting message associated user-to-user information of claim 9 wherein the received user generated analog signal containing message related information is a signal representing an image transmitted by a facsimile transmitter.

12. The method of transmitting message associated user-to-user information of claim 9 wherein the received user generated analog signal containing message related information is a signal representing digital data encoded and transmitted by a modem.

* * * * *

UNITED STATES PATENT AND TRADEMARK OFFICE
CERTIFICATE OF CORRECTION

PATENT NO. : 5,289,472
DATED : February 22, 1994
INVENTOR(S) : Kon Ho CHo

It is certified that error appears in the above-indentified patent and that said Letters Patent is hereby corrected as shown below:

On the title page, Item [54] and column 1, line 2, "TRANMISSION" should read --TRANSMISSION--.

Signed and Sealed this

Twenty-sixth Day of July, 1994

Attest:

BRUCE LEHMAN

*Attesting Officer*  *Commissioner of Patents and Trademarks*